United States Patent
Yoo et al.

(10) Patent No.: US 9,950,930 B2
(45) Date of Patent: Apr. 24, 2018

(54) PREPARATION METHOD OF GRAPHENE

(71) Applicant: LG Chem, Ltd., Seoul (KR)

(72) Inventors: Kwang Hyun Yoo, Daejeon (KR);
Kwon Nam Sohn, Daejeon (KR); Won Jong Kwon, Daejeon (KR); Kil Sun Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/039,655

(22) PCT Filed: Dec. 24, 2014

(86) PCT No.: PCT/KR2014/012829
§ 371 (c)(1),
(2) Date: May 26, 2016

(87) PCT Pub. No.: WO2015/099457
PCT Pub. Date: Jul. 2, 2015

(65) Prior Publication Data
US 2017/0166449 A1    Jun. 15, 2017

(30) Foreign Application Priority Data

Dec. 26, 2013  (KR) ........................ 10-2013-0164672
Dec. 23, 2014  (KR) ........................ 10-2014-0187595

(51) Int. Cl.
| | | |
|---|---|---|
| C01B 31/04 | (2006.01) | |
| C01B 32/184 | (2017.01) | |
| C01B 32/19 | (2017.01) | |
| C01B 32/194 | (2017.01) | |

(52) U.S. Cl.
CPC ........ *C01B 31/0446* (2013.01); *C01B 32/184* (2017.08); *C01B 32/19* (2017.08);
(Continued)

(58) Field of Classification Search
CPC ............ C01B 31/0446; C01B 31/0484; C01B 31/0469; C01B 2204/00
See application file for complete search history.

(56) References Cited

U.S. PATENT DOCUMENTS

| | | |
|---|---|---|
| 2010/0055458 A1 | 3/2010 | Jang et al. |
| 2011/0014111 A1 | 1/2011 | Leugers et al. |

(Continued)

FOREIGN PATENT DOCUMENTS

| | | |
|---|---|---|
| CN | 102249222 B | 1/2013 |
| EP | 3002313 A1 | 4/2016 |

(Continued)

OTHER PUBLICATIONS

Shen, et al., Preparation of graphene by jet cavitation, Nanotechnology 2011; 22: 365306 pp. 1-7.*

(Continued)

*Primary Examiner* — Daniel C McCracken
(74) *Attorney, Agent, or Firm* — Lerner, David, Littenberg, Krumholz & Mentlik, LLP

(57) ABSTRACT

Disclosed herein is a preparation method of graphene, capable of preparing graphene having a smaller thickness and a large area, and with reduced defect generation, by a simplified process. The preparation method of graphene includes forming dispersion including a carbon-based material including unoxidized graphite, and a dispersant; and continuously passing the dispersion through a high pressure homogenizer including an inlet, an outlet, and a micro-channel for connection between the inlet and the outlet, having a diameter in a micrometer scale, wherein the carbon-based material is exfoliated, as the material is passed through the micro-channel under application of a shear force, thereby forming graphene having a thickness in nanoscale.

14 Claims, 11 Drawing Sheets

(52) U.S. Cl.
CPC ........ *C01B 32/194* (2017.08); *C01B 2204/00* (2013.01); *C01P 2002/82* (2013.01); *C01P 2002/85* (2013.01); *C01P 2002/86* (2013.01); *C01P 2002/89* (2013.01); *C01P 2004/03* (2013.01); *C01P 2004/04* (2013.01); *C01P 2004/24* (2013.01)

(56) References Cited

U.S. PATENT DOCUMENTS

| | | |
|---|---|---|
| 2012/0201738 A1 | 8/2012 | Kwon et al. |
| 2012/0326093 A1 | 12/2012 | Landorf |
| 2013/0136684 A1 | 5/2013 | Wu et al. |
| 2014/0323596 A1 | 10/2014 | Jeong et al. |
| 2017/0158512 A1 | 6/2017 | Sohn et al. |

FOREIGN PATENT DOCUMENTS

| | | | |
|---|---|---|---|
| JP | 2012166989 A | 9/2012 | |
| JP | 2013112604 A | 6/2013 | |
| JP | 2017500265 A | 1/2017 | |
| KR | 20110036721 A | 4/2011 | |
| KR | 20120039799 A | 4/2012 | |
| KR | 20120049679 A | 5/2012 | |
| KR | 20130004638 A | 1/2013 | |
| KR | 10-1274441 B1 | 6/2013 | |
| KR | 20130060661 A | 6/2013 | |
| KR | 20130109711 A | 10/2013 | |
| KR | 20130137839 A | 12/2013 | |
| WO | 2013172350 A1 | 11/2013 | |

OTHER PUBLICATIONS

Choi, et al., Production of graphene by exfoliation of graphite in a volatile organic solvent, Nanotechnology 2011; 22: 365605—pp. 1-6.*

International Search Report from PCT/KR2014/012829, dated Apr. 14, 2015.

Du, Wencheng, et al., "From graphite to graphene: direct liquid-phase exfoliaton of graphite to produce a single- and few-layered pristine graphene." Journal of Materials Chemistry A, E-pub., Jul. 15, 2013, vol. 1, pp. 10592-10606.

Luo, Peicheng, et al., "Dispersion of single-walled carbon nanotubes by intense turbulent shear in micro-channels." Carbon, E-pub, Nov. 25, 2013, vol. 68, pp. 610-618.

Liang, Shuaishuai et al., "One-step green synthesis of graphene nanomesh by fluid-based method." The Royal Society of Chemistry, E-pub., Apr. 2, 2014, vol. 4, pp. 16127-16131.

Yi, Min,et al., "A fluid route for producing graphene and its analogues," Chinese Science Bulletin, E-pub, Apr. 4, 2014, vol. 59, pp. 1794-1799.

Tölle, Folke Johannes, "Emulsifier-Free Graphene Dispersions with High Graphene Content for Printed Electronics and Freestanding Graphene Films." Advanced Functional Materials, 2012, vol. 22, pp. 1136-1144.

Vadukumpully, Sajini, et al, "Cationic surfactant mediated exfoliation of graphite into graphene flakes." Carbon, vol. 47, 2009, pp. 3288-3294.

Lee, Dong-Woo, et al., "An amphiphilic pyrene sheet for selective functionalization of graphine." Chem. Commun., vol. 47, 2011, pp. 8259-8261.

Extended European Search Report for Application No. EP14875212 dated May 29, 2017.

Keiichi Sano, Material Stage, Japan, Aug. 10, 2013, vol. 13, No. 5, and p. 55-58, (Technical Information Institute Co., Ltd); Published: Aug. 10, 2013.

Yi Min et al: "Morphology and structure of mono- and few-layer graphene produced by jet cavitation" Applied Physics Letters, A I P Publishing LLC, US, vol. 99, No. 12, Sep. 19, 2011 (Sep. 19, 2011), pp. 123112-123112, XP012153098, ISSN: 0003-6951, DOI: 10.1063/1.3641863 [retrieved on Sep. 21, 2011] pp. 123112-1, col. 2-pp. 123112-2 figures 1-4.

* cited by examiner

[FIG. 1]
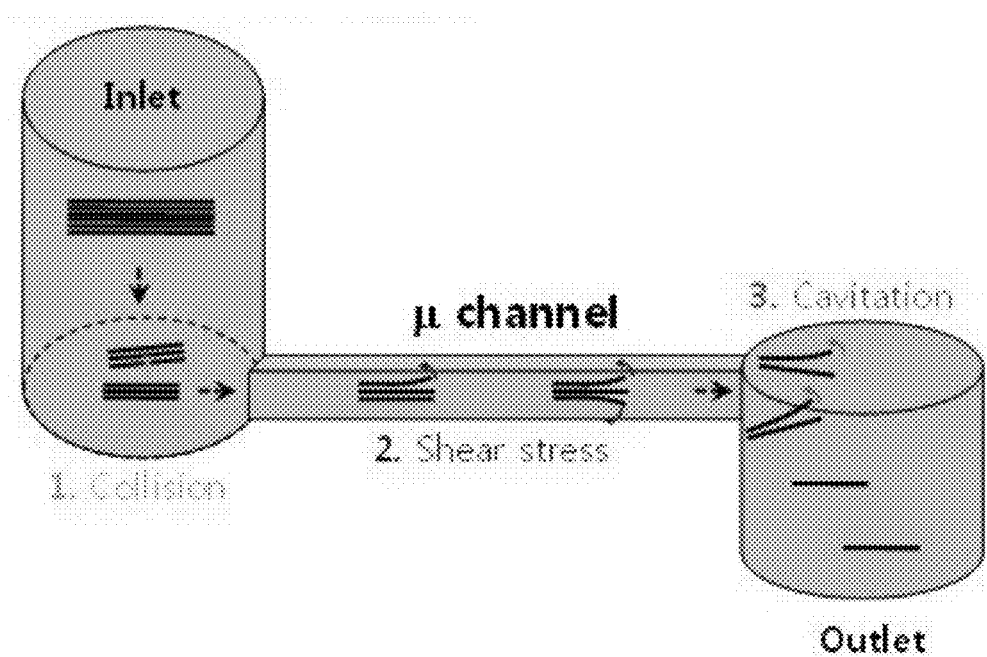

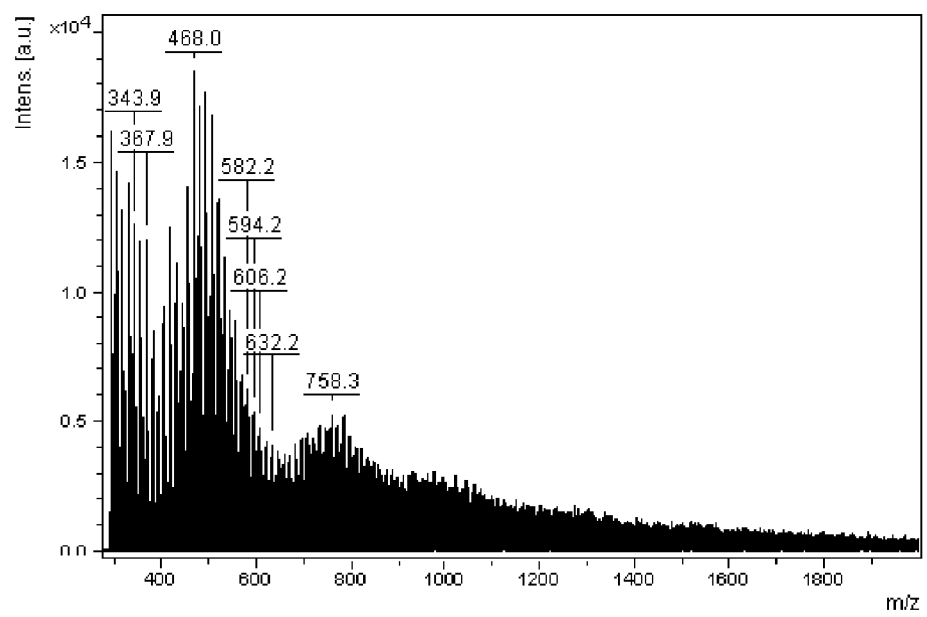
[FIG. 2A]

[FIG. 2B]
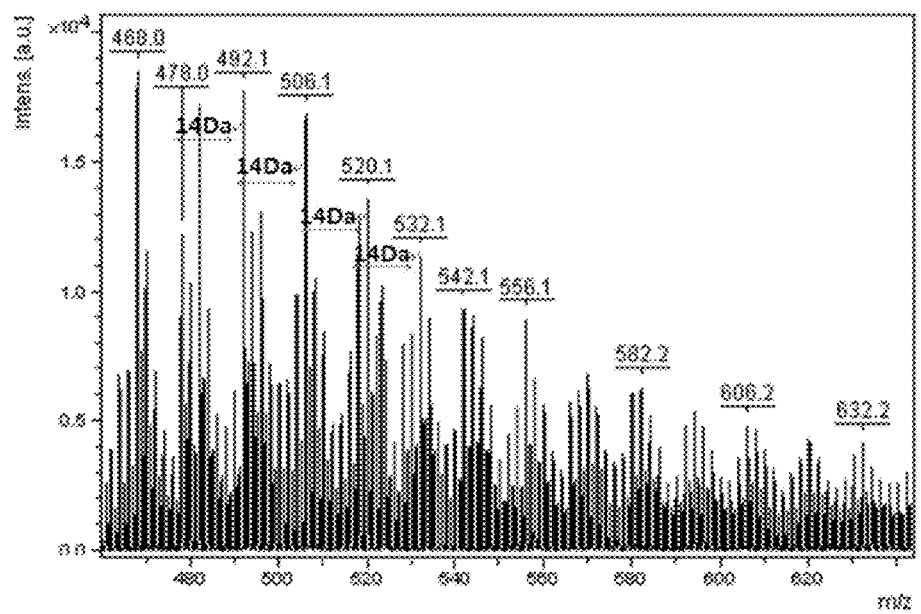
[FIG. 3A]
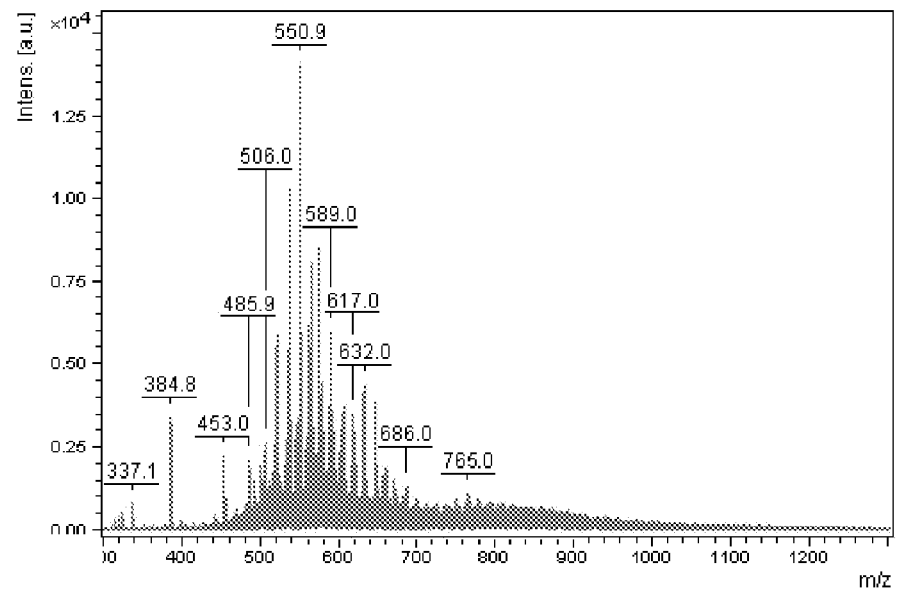

[FIG. 3B]
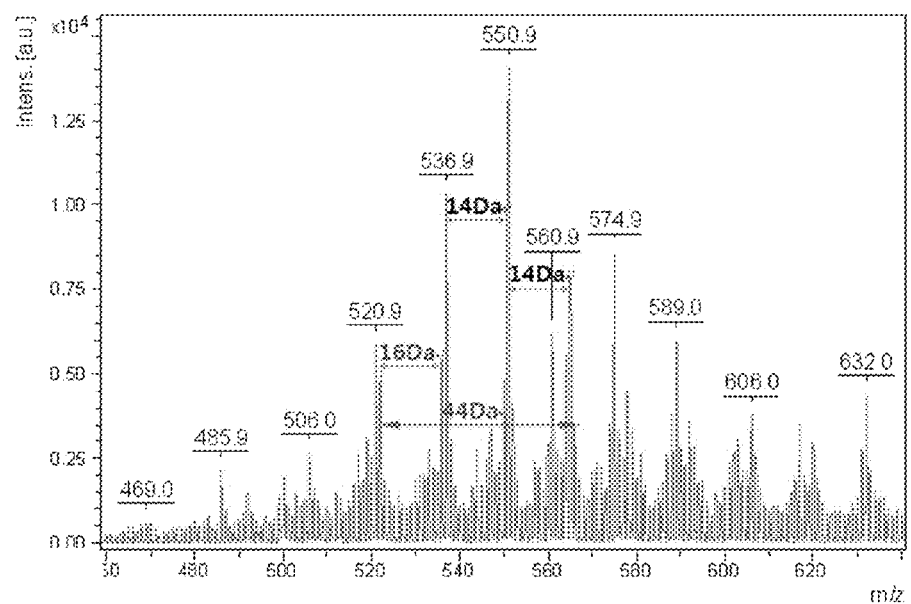
[FIG. 4]
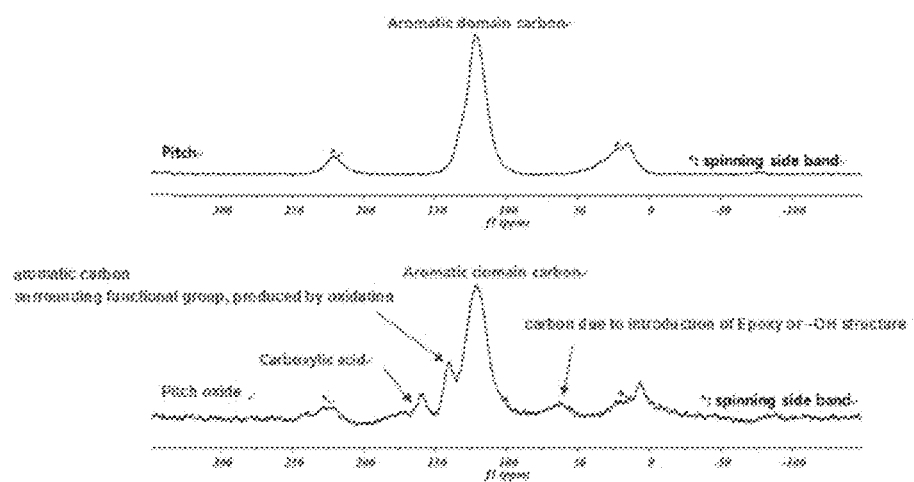

[FIG. 5]
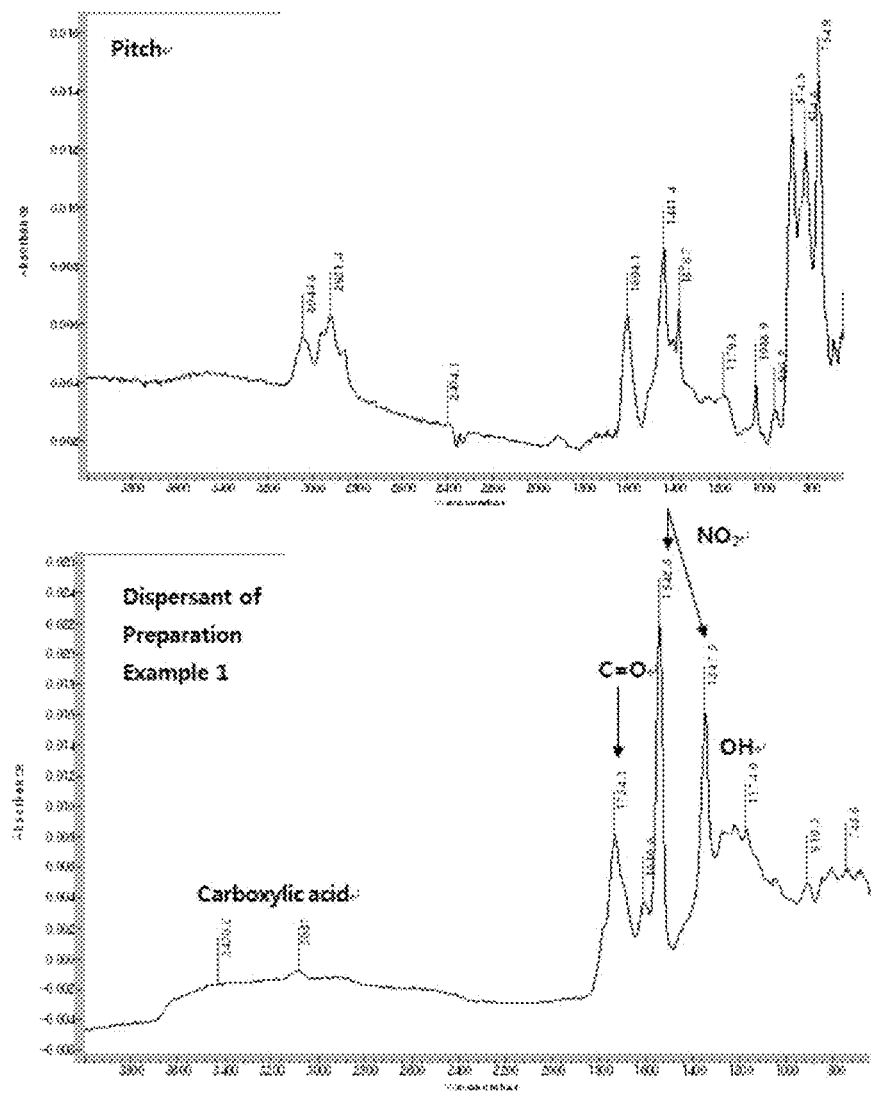

[FIG. 6]
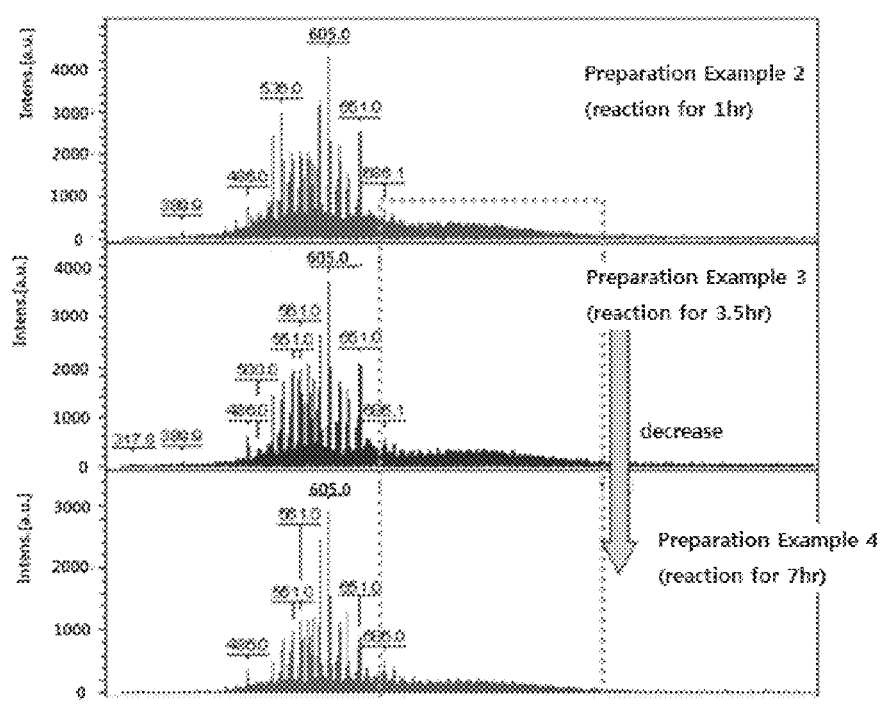
[FIG. 7]
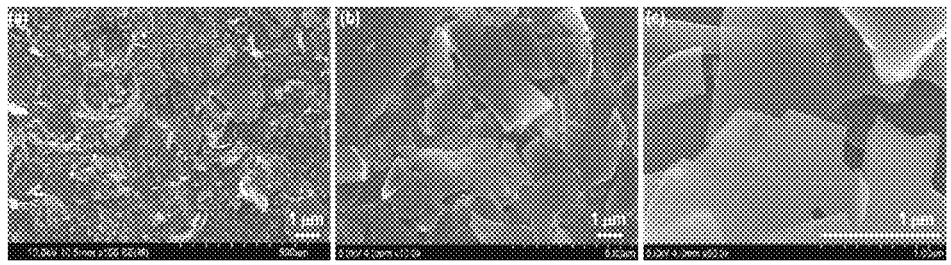

[FIG. 8]
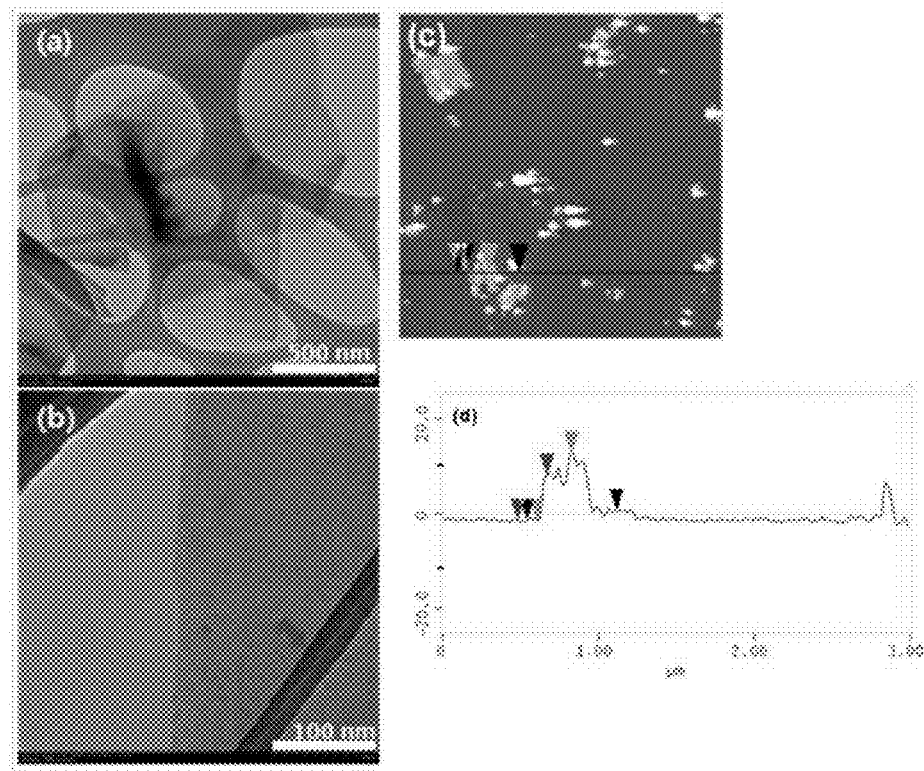
[FIG. 9]
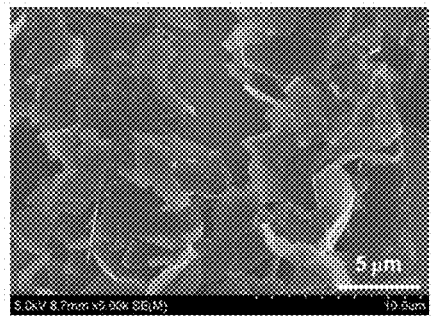

[FIG. 10]
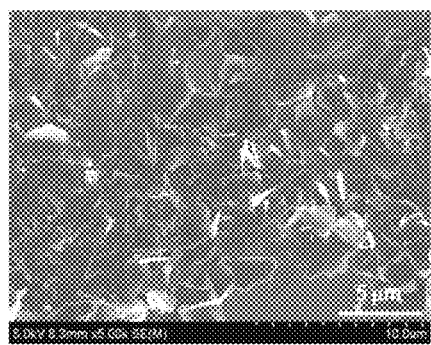
[FIG. 11]
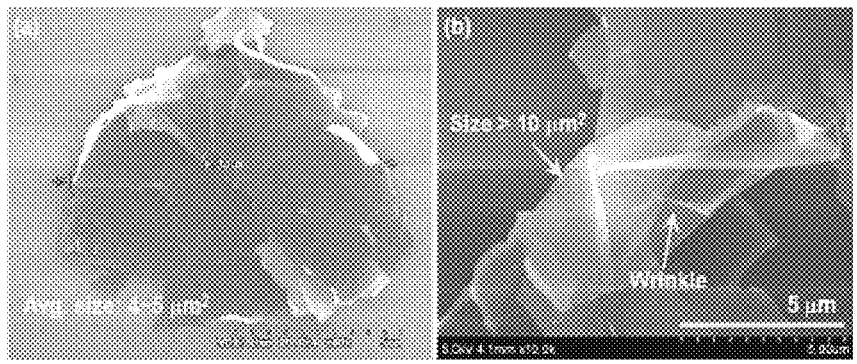

[FIG. 12]
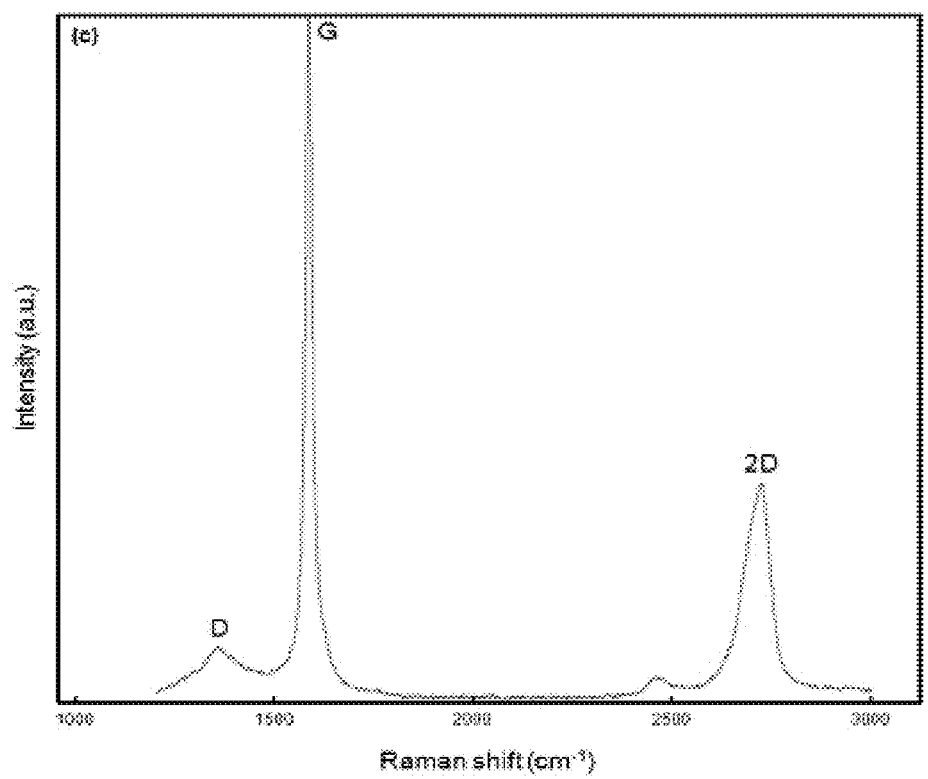

[FIG. 13]
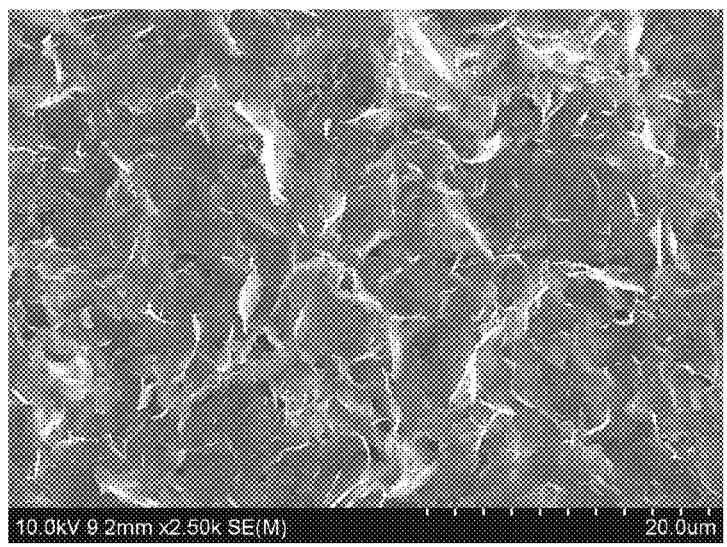
[FIG. 14]
|  | C | | O | | N | | S | |
| --- | --- | --- | --- | --- | --- | --- | --- | --- |
|  | Avg. | Sdv. | Avg. | Sdv. | Avg. | Sdv. | Avg. | Sdv. |
| 85°C/20hr | 96.36 | 0.02 | 9.46 | 0.25 | 0.09 | 0.12 | 0.74 | 0.03 |

[FIG. 15]
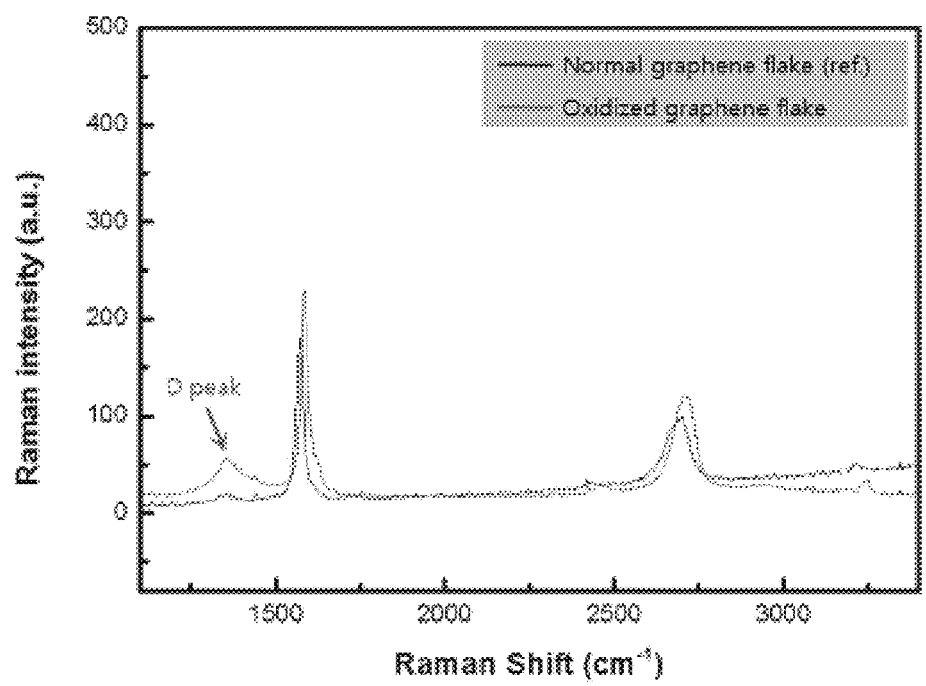

PREPARATION METHOD OF GRAPHENE

CROSS-REFERENCE TO RELATED APPLICATION

The present application is a national phase entry under 35 U.S.C. § 371 of International Application No. PCT/KR2014/012829, filed Dec. 24, 2014, which claims priority from Korean Application Nos. KR 10-2013-0164672, filed Dec. 26, 2013, and KR 10-2014-0187595, filed Dec. 23, 2014, all of which are incorporated herein by reference.

TECHNICAL FIELD

The present invention relates to a preparation method of graphene, capable of preparing graphene having a smaller thickness and a large area, and with reduced defect generation, by a simplified process.

BACKGROUND

Generally, graphene is a semimetallic material where carbon atoms form an arrangement connected in a hexagonal shape by two-dimensional sp2 bonding while having a thickness corresponding to a carbon atom layer. Recently, it has been reported that the properties of a graphene sheet having one carbon atomic layer were evaluated, and as a result, the graphene sheet may show very excellent electrical conductivity of electron mobility of about 50,000 cm2/Vs or more.

Further, graphene has the properties of structural and chemical stability and excellent thermal conductivity. In addition, graphene is consisting of only carbon which is a relatively light element, and thus, easy to be processed in one-dimensional or two-dimensional nanopatterns. Most of all, the graphene sheet is inexpensive materials and has excellent price competitiveness, as compared with existing nanomaterials.

Due to such electrical, structural, chemical and economical properties, graphene is expected to replace a silicon-based semiconductor technology and a transparent electrode in the future, and especially, is possible to be applied to a flexible electronic device field due to excellent mechanical properties.

Due to the numerous advantages and excellent properties of the graphene, various methods capable of more effective mass production of the graphene from carbon-based materials such as graphite, have been suggested or studied. Particularly, a method capable of preparing a graphene sheet or flake with less defect generation, and having a smaller thickness and a large area by a more simplified process has been studied in various ways, so that excellent properties of the graphene are more dramatically expressed. The existing methods of preparing graphene as such include the following:

First, a method wherein a graphene sheet is exfoliated from graphite by a physical method such as using a tape, is known. However, such method is not suitable for mass production, and has a very low exfoliation yield.

Further, another method wherein graphite is exfoliated by a chemical method such as oxidation, or acid, base, metal, and the like are inserted between the graphite carbon layers to obtain graphene or an oxide thereof which is exfoliated from an intercalation compound, is known. However, the former method may generate a number of defects on finally prepared graphene, in the course of obtaining graphene by proceeding with exfoliating by oxidation of graphite, and reducing a graphene oxide obtained therefrom again to obtain graphene. This may adversely affect the properties of finally prepared graphene. Further, the latter method also requires further processes such as using and treating the intercalation compound, and thus, the overall process is complicated, the yield is insufficient, and the economics of the process may be poor. Moreover, it is not easy to obtain a graphene sheet or flake having a large area in such a method.

Due to the problems of those methods, recently, a method of preparing graphene by exfoliating carbon layers contained in graphite by a milling method using ultrasonic irradiation, a ball mill or the like, in a state of dispersing graphite and the like in liquid, is applied the most. However, such methods also had problems of being difficult to obtain graphene having sufficiently small thickness, generating a number of defects on graphene in an exfoliating process, having insufficient exfoliating yield and a mass production property, or the like.

In addition, a method of preparing graphene by exfoliating the graphite and the like using a homogenizer such as a high speed homogenizer, has also been suggested. However, in the existing method as such, it was common that mainly the raw material such as graphite is oxidized, or subjected to high-temperature heat treatment and crushing, thereby forming a graphite worm or oxidized graphite, which is then exfoliated to prepare graphene. Nevertheless, a number of defects were generated on the raw material during the high-temperature heat treatment and crushing process, thereby greatly reducing the thermal, electrical or mechanical properties of the finally prepared graphene. Further, due to the need of progress of the high-temperature heat treatment and crushing process, and the like, the overall process may be complicated, and it became difficult to prepare graphene having sufficiently large area.

Moreover, in case of exfoliating the oxidized graphite, the exfoliated product therefrom was obtained as oxidized graphene containing defects and oxygen, and thus, it had poor electrical conductivity, as compared with general graphene. In order to solve the problems, a reduction process of oxidized graphene and the like were additionally required for obtaining graphene. As a result, the overall process became more complicated, and even after reduction, the physical properties of the graphene were not completely restored to those before oxidation.

Because of these, a preparation method of graphene, capable of preparing graphene having a smaller thickness and a large area, and with reduced defect generation, thereby maintaining excellent properties, by a simplified process, has been continuously demanded.

SUMMARY OF THE INVENTION

The present invention provides a preparation method of graphene, capable of preparing graphene having a smaller thickness and a large area, and with reduced defect generation, by a simplified process.

An exemplary embodiment of the present invention provides a preparation method of graphene, including forming dispersion including a carbon-based material including unoxidized graphite, and a dispersant; and continuously passing the dispersion through a high pressure homogenizer including an inlet, an outlet, and a micro-channel for connection between the inlet and the outlet, having a diameter in a micrometer scale, wherein the carbon-based material is exfoliated, as the material is passed through the micro-channel under application of a shear force, thereby forming graphene having a thickness in nanoscale.

In such preparation method of graphene, the unoxidized graphite may become graphite having an element ratio of oxygen to carbon (O/C atomic ratio) of about 5% or less, or about 0 to 5%, or about 0.001 to 3%, as measured by elemental analysis measurement by combustion or XPS analysis (X-ray photoelectron spectrometry analysis).

Further, in the preparation method of graphene, it is appropriate that the unoxidized graphite used as a raw material may be planar graphite.

Further, in the preparation method of graphene, the dispersion may be dispersion in which a carbon-based material and a dispersant are dissolved or dispersed in an aqueous solvent or a polar organic solvent.

Further, the dispersant may be any one of various dispersants, however, more appropriately, it may include a mixture of plural kinds of polyaromatic hydrocarbon oxides, containing the polyaromatic hydrocarbon oxides having a molecular weight of about 300 to 1000 in a content of about 60% by weight or more. The dispersant may have an oxygen content of about 12 to 50% by weight, based on the total element content, when the plural kinds of polyaromatic hydrocarbon oxides contained in the dispersant are subjected to elemental analysis Further, the polyaromatic hydrocarbon oxides contained in the dispersant may have a structure where one or more oxygen-containing functional group is bonded to an aromatic hydrocarbon containing 5 to 30, or 7 to 20 benzene rings.

Meanwhile, in the above-described preparation method of graphene, the micro-channel of the high pressure homogenizer may have a diameter of about 10 to 800 μm. Further, the dispersion may be introduced to the inlet of the high pressure homogenizer under application of pressure of about 100 to 3000 bar to be exfoliated, as it is passed through the micro-channel, thereby preparing graphene.

The graphene flake prepared in the above-described method may have a thickness of about 0.3 to 50 nm, or about 0.3 to 30 nm, a diameter of about 0.1 to 10 μm, or about 0.1 to 5 μm, and a diameter/thickness ratio of about 50 to 6000, or about 50 to 1000.

The above-described preparation method of graphene may further include recovering graphene flakes from the dispersion of graphene flakes and drying the graphene flakes. Herein, the recovering may proceed by centrifugation, vacuum filtration or pressure filtration, and the drying may proceed by vacuum-drying at a temperature of about 30 to 200° C.

ADVANTAGEOUS EFFECTS

According to the present invention, due to the use of the dispersant and the high pressure homogenizer, the exfoliating method may be optimized in a state where unoxidized graphite as a raw material is more uniformly dispersed, thereby preparing graphene.

Therefore, according to the present invention, a pretreatment process of an exfoliating process as conventionally applied, for example, a high-temperature heat treatment and crushing process for forming a graphite worm, an oxidation process for forming oxidized graphite, or the like may be omitted, and this may be more pronounced by using planar graphite as the raw material. Therefore, the generation of a number of defects in the high-temperature heat treatment and crushing process, the oxidation process, or the like may be suppressed; the complication of the preparation process of graphene by the oxidation and re-reduction process may be prevented; and the preparation method of graphene may be very simplified. In addition, according to the present invention, a graphene flake having a smaller thickness and a large area, or the like may be easily prepared in a high yield.

BRIEF DESCRIPTION OF DRAWINGS

FIG. 1 is an outlined schematic view showing a principle of high pressure homogenizer usable in a preparation method of graphene of an exemplary embodiment.

FIGS. 2A and 2B (enlarged views in a range of molecular weight of 400 to 500) are drawings showing molecular weight distribution of pitch used for preparation of a dispersant in the Preparation Examples by analyzing it by a MALDI-TOF mass spectrum.

FIGS. 3A and 3B (enlarged views in a range of molecular weight of 400 to 500) are drawings showing molecular weight distribution of a dispersant obtained in Preparation Example 1 by analyzing it by a MALDI-TOF mass spectrum.

FIG. 4 is a drawing showing the analysis results, after analyzing pitch and a dispersant of Preparation Example 1 by a 13C CPMAS NMR, respectively.

FIG. 5 is a drawing showing the analysis results, after analyzing pitch and a dispersant of Preparation Example 1 by a FT-IR, respectively.

FIG. 6 is a drawing showing comparison of the analysis results, after analyzing molecular weight distributions of dispersants each of which is obtained in Preparation Examples 2 to 4 by a MALDI-TOF mass spectrum.

FIG. 7 shows an electron micrograph of graphite used as a raw material for preparation of graphene flakes of the Examples (a), and electron micrographs of graphene flakes each of which is prepared in Example 1 (b and c).

FIG. 8 shows TEM analysis results (a and b), and AFM analysis results (c and d), for measuring a diameter and a thickness of a graphene flake of Example 1, respectively.

FIGS. 9 to 11 are electron micrographs of graphene flakes each of which is prepared in Comparative Examples 3 and 4, and Comparative Example FIG. 12 is a Raman spectrum of the graphene flake of Example 1.

FIG. 13 is an electron micrograph of the oxidized graphene flake of Comparative Example 2.

FIGS. 14 and 15 are the results of elemental analysis and a Raman spectrum of the oxidized graphene flake of Comparative Example 2.

DETAILED DESCRIPTION OF EMBODIMENTS

Hereinafter, a preparation method of graphene according to an exemplary embodiment of the present invention, and a dispersed composition of graphene will be described in detail.

Some of the terms used herein may be defined as follows.

First, hereinafter, a "dispersant" refers to any component for uniformly dispersing other components, for example, a carbon-based material such as graphite such as planar graphite, or graphene (flake), or the like within an aqueous solvent, an organic solvent, or other liquid medium. A composition in which other components to be subjected to dispersion such as the "dispersant" and the carbon-based material are dispersed within a liquid medium, may be referred to as "dispersion" or a "dispersed composition", and such "dispersion" or "dispersed composition" may be present in different states such as a liquid state, a slurry state or a paste state. Further, such "dispersion" or "dispersed composition" may be used in various applications such as a composition used in the preparing process of graphene as described hereinafter; a conductive material composition for a secondary battery; a composition for electrode or conductive composition applied in the manufacturing process of various batteries, displays, devices, or the like; an active material composition for a secondary battery and the like; a composition for preparing various polymers or resin composites; or an ink or paste composition applied in the manufacturing process of various electronic materials, devices, or the like; or the like, and the use thereof is not particularly limited. If only the "dispersant" and a component to be subjected to dispersion are included together within a liquid medium, such case may be defined as belonging to a category of the "dispersion" or "dispersed composition", regardless of the state or use thereof.

Further, hereinafter, "polyaromatic hydrocarbon" may refer to an aromatic hydrocarbon compound in which aromatic rings, for example, two or more, or five or more benzene rings are bonded to and contained in a single compound structure. Further, "polyaromatic hydrocarbon oxide" may refer to any compound in which one or more oxygen-containing functional group are bonded within the chemical structure, by the reaction of the above described "polyaromatic hydrocarbon" with an oxidant. Herein, the oxygen-containing functional group to be introduced to the "polyaromatic hydrocarbon" by the reaction with the oxidant may be any functional group which may be bonded to the aromatic ring, and contains one or more oxygens in the functional group, such as a hydroxy group, an epoxy group, a carboxy group, a nitro group or sulphonic acid.

Further, hereinafter, a "carbon-based material" may refer to any material mainly containing a carbon-carbon bond, for example, graphene, carbon nanotube, graphite such as planar graphite or a derivative thereof, carbon black, fullerene represented by C60, or the like fullerene-based materials or a derivative thereof, or the like, inclusively. However, it may be interpreted that the "polyaromatic hydrocarbon" or the oxides thereof which is a main component or a main raw material of a certain "dispersant" described hereinafter, does not belong to the category of such "carbon-based materials".

Further, hereinafter, "unoxidized graphite" may refer to graphite without additional oxidation treatment, or graphite, for example, indeterminate graphite, planar graphite, artificial graphite or the like, inclusively. However, the "unoxidized graphite" may contain a trace amount of naturally occurring oxygen by natural oxidation by air and the like, and the oxygen content may be about 5% or less, or about 0 to 5%, or about 0.001 to 3%, as an element ratio of oxygen to carbon (O/C atomic ratio), when the "unoxidized graphite" is analyzed by elemental analysis measurement by combustion or XPS analysis However, it is obvious that such "unoxidized graphite" contains significantly lower oxygen content, as compared with the "oxidized graphite" subjected to additional oxidation treatment (for example, an element ratio of oxygen to carbon (0/C atomic ratio) of about 20% or more).

Meanwhile, according to an exemplary embodiment of the present invention, a preparation method of graphene, including forming dispersion including a carbon-based material including unoxidized graphite, and a dispersant; and continuously passing the dispersion through a high pressure homogenizer including an inlet, an outlet, and a micro-channel for connection between the inlet and the outlet, having a diameter in a micrometer scale, wherein the carbon-based material is exfoliated, as the material is passed through the micro-channel under application of a shear force, thereby forming graphene having a thickness in nanoscale, is provided.

In the preparation method of graphene of an exemplary embodiment, due to the use of the dispersant before exfoliating and the use of the high pressure homogenizer in exfoliating, the exfoliating method may be optimized in a state where unoxidized graphite as a raw material is more uniformly dispersed, thereby preparing graphene.

Therefore, according to the preparation method of an exemplary embodiment, a pretreatment process which was essentially required in the exfoliating method using the existing homogenizer, ultrasonic irradiation, or the like, for example, a high-temperature heat treatment and crushing process on graphite for forming a graphite worm, or an additional oxidation process for forming oxidized graphite, may be omitted. That is, in the method of an exemplary embodiment, it was found that after dispersion including the unoxidized graphite and a dispersant is obtained, as it is continuously passed through a high pressure homogenizer having a predetermined structure, graphene having a smaller thickness and a large area may be prepared in a high yield, without an additional pretreatment process, Herein, "continuously" proceeding with a subsequent exfoliating process using a high pressure homogenizer, after obtaining the dispersion, may refer to as not proceeding with an additional heat treatment or crushing process, an oxidation process, or the like, between the forming process of the dispersion and the exfoliating process, and hereinafter, unless otherwise stated, may be interpreted in the same meaning.

As such, as the pretreatment process such as the high-temperature heat treatment and crushing process, the oxidation process, or the like is possible to be omitted, the generation of a number of defects in such pretreatment process may be suppressed, and the preparation process of graphene may be very simplified. Particularly, a process of previously exfoliating oxidized graphite to obtain oxidized graphene, which is then redispersed to obtain graphene, may also be omitted, and thus, the preparation process of graphene showing excellent electrical properties, and the like may be very simplified.

Therefore, according to the preparation method of an exemplary embodiment, graphene having minimized generation of defects, and a smaller thickness and a large area, and thus, showing excellent properties may be prepared by a very simplified process.

In addition, in the existing method, during the preparing process or after the preparation of graphene, for the purpose of additionally improving the dispersibility of the exfoliated graphene and forming the dispersion, dispersed composition or the like for application in various uses, it was necessary to further add a dispersant to the exfoliated graphene, and further proceed with ultrasonic dispersion and the like. Moreover, in such existing method, crushing in a sheet direction of the graphene may be generated in the ultrasonic irradiation process and the like, and thus, the area of graphene may be more decreased, and the properties thereof may also be deteriorated.

However, in the method of an exemplary embodiment, as the exfoliating process using a high pressure homogenizer proceeds in a dispersion state containing the dispersant, the dispersion of graphene may be carried out together during the exfoliating process. Therefore, a post-treatment process such as ultrasonic irradiation for the dispersibility improvement is not necessary, and in the course of the process, crushing of graphene in a sheet direction may also be suppressed, and thus, after preparing graphene having a larger area or the dispersion thereof by a very simplified process, the graphene and the dispersion thereof may be preferably applied in various uses.

Meanwhile, hereinafter, a preparation method of graphene according to an exemplary embodiment will be described in detail for each step.

In the preparation method of graphene of an exemplary embodiment as described above, first, dispersion including a carbon-based material including unoxidized graphite, and a dispersant may be formed.

Herein, the kind of the unoxidized graphite, usable as the raw material is not particularly limited, and as the graphite neither oxidized nor pretreated by an additional process, graphite or the like carbon structure has a three-dimensional structure in the form where carbon atomic layers are stacked, any carbon-based material to prepare graphene and the like having one or more carbon atomic layers by exfoliating it by any physical force such as high speed, high pressure, ultrasonic irradiation or shear force, may be used.

Therefore, as a specific example of the unoxidized graphite, indeterminate graphite, planar graphite, artificial graphite, or the like may be included, and a mixture of two or more compounds selected therefrom may be used as the unoxidized graphite which is the raw material.

More suitably, among the unoxidized graphite, planar graphite may be used. Due to the use of such planar graphite, the formation of graphene by exfoliating may be more effectively achieved. Therefore, the pretreatment process such as a high-temperature heat treatment and crushing process for forming a graphite worm, an additional oxidation process for forming oxidized graphite, or the like may be omitted, and graphene having a smaller thickness and a larger area by being more effectively exfoliated by a high pressure homogenizer, may be prepared. Therefore, through this, graphene having more excellent properties and minimized defect generation may be well-prepared.

Further, the dispersion may be a dispersion in which a carbon-based material including unoxidized graphite and a dispersant are dissolved or dispersed in an aqueous solvent or a polar organic solvent. Since this dispersion may be present in a state where the carbon-based material including unoxidized graphite is uniformly dispersed by the action of a dispersant, a subsequent exfoliating process may proceed in such an optimized dispersed state to effectively form a graphene flake having a smaller thickness and large area.

In addition, in the dispersion used as the raw material, the aqueous solvent or the polar organic solvent may include any aqueous solvent or polar organic solvent such as one or more selected from the group consisting of water, NMP, acetone, DMF (N,N-dimethylformamide), DMSO (Dimethyl sulfoxide), ethanol, isopropyl alcohol, methanol, butanol, 2-ethoxy ethanol, 2-butoxy ethanol, 2-methoxy propanol, THF (tetrahydrofuran), ethylene glycol, pyridine, dimethylacetamide, N-vinyl pyrrolidone, methyl ethyl ketone (butanone), α-terpinol, formic acid, ethyl acetate and acrylonitrile.

In addition, as the dispersant, any material which has been known before to be usable for uniformly dispersing various carbon-based materials in a polar solvent, such as tannic acid, Triton X-100 (trade name) or Pluronics F-127 (trade name), may be used. However, more suitably, a dispersant including a mixture of plural kinds of polyaromatic hydrocarbon oxides, containing the polyaromatic hydrocarbon oxides having a molecular weight of about 300 to 1000 in a content of about 60% by weight or more, may be used.

The certain dispersant was newly prepared by the present inventors, and filed as a Korean Patent Application No. 10-2013-0091625 (Aug. 1, 2013). It will be described in detail as follows.

Pitch which is discharged as a residue and the like in a refining process of fossil fuels such as petroleum or coal, is a byproduct used for asphalt production, and the like, and may be formed as a viscous mixture containing plural kinds of polyaromatic hydrocarbons having a plurality of aromatic rings. However, as a result of the present inventor's experiment, it was confirmed that if such pitch and the like undergo an oxidation process using an oxidant, among polyaromatic hydrocarbons contained in the pitch, polyaromatic hydrocarbons having excessively large molecular weight are at least partly decomposed, and a mixture of polyaromatic hydrocarbons having a relatively narrow molecular weight distribution is obtained. In addition, it was confirmed that as one or more oxygen-containing functional groups are introduced to the aromatic ring of each polyaromatic hydrocarbon, a mixture containing plural kinds of polyaromatic hydrocarbon oxides is obtained.

Specifically, a mixture of polyaromatic hydrocarbon oxides obtained in this method was confirmed to contain polyaromatic hydrocarbon oxides having a molecular weight of about 300 to 1000, or about 300 to 700 in about 60% by weight or more, or about 65% by weight or more, or about 70 to 95% by weight, as analyzed by MALDI-TOF MS. Specific kinds, structure, distribution and the like of the polyaromatic hydrocarbon oxides contained in the mixture may be varied depending on the kind or origin of the pitch as a raw material, the kind of an oxidant, or the like. However, at least, the mixture of the polyaromatic hydrocarbon oxides included in the dispersant contains plural kinds of polyaromatic hydrocarbon oxides having a structure where one or more oxygen-containing functional groups are introduced to each polyaromatic hydrocarbon having 5 to 30, or 7 to 20 benzene rings, respectively, and the polyaromatic hydrocarbon oxides in the mixture have the above-described molecular weight distribution, that is, a molecular weight distribution where oxides having a molecular weight of about 300 to 1000, or about 300 to 700 are contained in about 60% by weight or more, based on the total compound.

Herein, the kind of the oxygen-containing functional group may be varied depending on the kind of the oxidant used in the oxidation process of the pitch and the like, but for example, may be one or more selected from the group consisting of a hydroxy group, an epoxy group, a carboxy group, a nitro group and sulphonic acid.

The polyaromatic hydrocarbon oxides satisfying the above-described structural feature, the molecular weight distribution and the like, and the mixture thereof may have both a hydrophobic π-domain gathering aromatic rings, and a hydrophilic region by the oxygen-containing functional groups bonded to the aromatic ring and the like, at the same time. Among these, the hydrophobic π-π domain may π-π interact with a surface of the carbon-based material in which carbon-carbon bonds are formed such as unoxidized graphite, or graphene (flake), and the hydrophilic region may express repulsion between each single carbon-based material (for example, each particle of each graphene or graphite). As a result, the above-described dispersant including the mixture of the polyaromatic hydrocarbon oxides may be present between the molecules of the carbon-based material in a liquid medium such as an aqueous solvent or a polar organic solvent, and uniformly disperse the carbon-based material. Therefore, it was confirmed that the dispersant may represent an excellent dispersion force to uniformly disperse the carbon-based material in a higher concentration even in the case of using relatively small amount.

Moreover, since the above-described dispersant represents water-solubility per se due to the presence of a hydrophilic region by the oxygen-containing functional group and the like, it may uniformly disperse the carbon-based material even in an environmentally friendly aqueous solvent. Particularly, the dispersant was confirmed to represent an excellent dispersion force to uniformly disperse the carbon-based material in a high concentration, in various polar organic solvents, as well as an environmentally friendly aqueous solvent.

Due to the excellent dispersion force of the dispersant, in the preparation method of an exemplary embodiment, unoxidized graphite as a raw material may be more uniformly dispersed in a high concentration. Therefore, by exfoliating the raw material in such optimized dispersion state, graphene having a smaller thickness and a large area, may be more easily prepared. Moreover, since the dispersant may be maintained in a state of being physically attached to the surface of a finally formed graphene, the graphene prepared in the method of an exemplary embodiment may represent excellent dispersibility in various polar solvents, and the like per se.

Meanwhile, the above-described dispersant may have an oxygen content in the total mixture of about 12 to 50% by weight, or about 15 to 45% by weight, based on the total element content, when the plural kinds of polyaromatic hydrocarbon oxides contained in the dispersant are subjected to elemental analysis. Such oxygen content reflects a degree of the introduction of the oxygen-containing functional group by the oxidation process in the polyaromatic hydrocarbon oxides, and as the oxygen content is satisfied, the above-described hydrophilic region may be included in an appropriate degree. As a result, in the above-described method of an exemplary embodiment, unoxidized graphite as a raw material may be more uniformly dispersed using the dispersant; graphene having a small thickness may be more effectively obtained therefrom; and the dispersibility of the finally prepared graphene may be more improved.

The oxygen content may be calculated by elemental analysis of the plural kinds of polyaromatic hydrocarbon oxides contained in the above-described mixture. That is, when a sample of the mixture (for example, about 1 mg) is, for example, heated to a high temperature of about 900° C. around on a thin foil, the foil is instantaneously melted so that the temperature is raised to about 1500 to 1800° C., and by such high temperature, gas is generated from the mixture sample, thereby collecting generated gas, and measuring and analyzing the element content thereof. As a result of the elemental analysis, total element contents of carbon, oxygen, hydrogen and nitrogen contained in the plural kinds of polyaromatic hydrocarbon oxides may be measured and analyzed, and the oxygen content to the total element content may be calculated.

Meanwhile, the above-described dispersant may be prepared by a method including oxidizing the mixture containing polyaromatic hydrocarbon having a molecular weight of about 200 to 1500.

As already described above, pitch discharged as a residue in the refining process of fossil fuels such as petroleum or coal, may contain plural kinds of polyaromatic hydrocarbon, and be in a mixture state of being viscous or in a powder form. Of course, the specific kinds, structure, compositional ratio or molecular weight distribution of the polyaromatic hydrocarbon may be varied depending on the raw material or origin of the pitch, however, the pitch may include plural kinds of polyaromatic hydrocarbons containing for example, 5 to 50 aromatic rings, for example, benzene rings in the structure, and largely include polyaromatic hydrocarbons having a molecular weight of about 200 to 1500. For example, a mixture including polyaromatic hydrocarbons having a molecular weight of about 200 to 1500 (e.g., pitch), used as a starting material in a method of preparing the dispersant, may include the polyaromatic hydrocarbons in such molecular weight range in a content of about 80% by weight or more, or about 90% by weight or more.

However, if a mixture including polyaromatic hydrocarbons such as the pitch undergo an oxidation process using an oxidant, among polyaromatic hydrocarbons contained in the pitch, polyaromatic hydrocarbons having excessively large molecular weight may be decomposed, and a mixture of polyaromatic hydrocarbons having a relatively narrow molecular weight distribution may be obtained. For example, polyaromatic hydrocarbons having a molecular weight more than about 1000, or about 700 may be decomposed to those having a less molecular weight. In addition, as one or more oxygen-containing functional groups are also introduced to each aromatic ring of each polyaromatic hydrocarbon, a mixture including plural kinds of polyaromatic hydrocarbon oxides, that is, a dispersant used in the method of an exemplary embodiment may be very simply prepared.

In the method of preparing the dispersant, the kind of oxidant is not particularly limited, and any oxidant may be used without limitation, if only it causes an oxidation reaction to introduce an oxygen-containing functional group to an aromatic hydrocarbon. Specific example of the oxidant may include nitric acid ($HNO_3$), sulfuric acid ($H_2SO_4$), hydrogen peroxide ($H_2O_2$), ammonium cerium(IV) sulfate (($NH_4)_4Ce(SO_4)_4$), ammonium cerium(IV) nitrate (($NH_4)_2Ce(NO_3)_6$), or the like, and of course, a mixture of two or more selected therefrom may also be used.

Further, such oxidation process may proceed at a reaction temperature of about 10 to 110° C. for about 0.5 to 20 hours, in an aqueous solvent. As a specific example, the mixture containing the polyaromatic hydrocarbons may be added in a certain amount, in the presence of a liquid phase oxidant such as sulfuric acid and/or nitric acid, and the oxidation process may proceed at room temperature, for example, at about 20° C. or 80° C., for about 1 to 12 hours. As the reaction temperature, hour or the like in the oxidation process is controlled, the properties of the above-described dispersant, for example, an oxidation degree of the polyaromatic hydrocarbons may be properly adjusted to prepare a dispersant having desired properties.

Further, as described above, the mixture containing polyaromatic hydrocarbons having a molecular weight of about 200 to 1500, which is a starting material of the preparation method may be derived from pitch obtained from fossil fuels or a product thereof, and depending on the kind of the raw materials, the kind, structure or molecular weight distribution of the polyaromatic hydrocarbons may be different from each other. Nevertheless, as the mixture containing the polyaromatic hydrocarbons having a molecular weight of about 200 to 1500, derived from the pitch and the like undergoes the oxidation process, the above-described dispersant representing an excellent dispersion force to carbon-based materials may be simply prepared.

Meanwhile, in the preparation method as described above, a process of purifying the resulting product after the oxidation process to obtain the mixture of plural kinds of polyaromatic hydrocarbon oxides, may be further included, and such purification process may proceed by including a centrifugation process of the resulting product from the oxidation process. With such purification process, the mixture of the polyaromatic hydrocarbon oxides satisfying the above-described molecular weight distribution and the like may be obtained appropriately in a higher purity, and using the dispersant including the mixture, graphene may be more effectively prepared by the method of an exemplary embodiment.

Meanwhile, in the preparation method of graphene of an exemplary embodiment, after forming and providing the dispersion, the dispersion may be continuously passed through the high pressure homogenizer having a predetermined structure, thereby exfoliating unoxidized graphite contained in the dispersion, and through this, preparing graphene.

Traditionally, a method of proceeding with the exfoliating process using a high speed homogenizer, a ball mill, a bead mill or an ultrasonic irradiator, has been known. However, by a method using ultrasonic irradiation, graphene having an uniform thickness and a large area is difficult to be obtained, or a number of defects may be generated on the graphene in the exfoliating process, or an exfoliation yield may not be sufficient. In addition, also by a method of using a ball mill or a bead mill, graphene having sufficiently small thickness may be difficult to be obtained, and an exfoliation yield may also be insufficient. In addition to this, in case of the existing method using a homogenizer such as a high speed homogenizer, it is necessary to proceed with a high-temperature heat treatment and crushing process for forming a graphite worm, a oxidation process for forming oxidized graphite, or the like, and also in the course of this, a number of defects may be generated in graphene, and mass productivity may be deteriorated. Particularly, it has never been well-known before that only an exfoliating process on unoxidized graphite with a homogenizer and the like may proceed, without a pretreatment process such as additional oxidation process, high-temperature heat treatment process, crushing process, or the like, thereby preparing graphene having a large area and a small thickness corresponding to several atomic layers.

However, the present inventors have first discovered that exfoliating continuously (that is, without an additional pretreatment process) proceeds in an unoxidized graphite state by applying the method of an exemplary embodiment using the high pressure homogenizer, thereby preparing graphene having a large area and a small thickness, and with minimized defect generation. Therefore, it was confirmed that in case of proceeding with the exfoliating process using the high pressure homogenizer by the method of an exemplary embodiment, graphene having a smaller and uniform thickness and a large area, and with minimized defect generation, may be easily mass produced, without an additional pretreatment process, and thus, the problems of the above-described existing method may be solved.

FIG. 1 is an outlined schematic view showing a principle of high pressure homogenizer usable in a preparation method of graphene of an exemplary embodiment.

Referring to FIG. 1, the high pressure homogenizer may have an inlet of raw materials, an outlet of a product resulting from exfoliating such as graphene flakes, and a micro-channel for connection between the inlet and the outlet having a diameter in micrometer scale. Through the inlet of the high pressure homogenizer, for example, high pressure of about 100 to 3000 bar is applied, while a raw material in the state of dispersion including unoxidized graphite is introduced, and then the raw material is passed through the micro-channel in micron scale (μm), for example, having a diameter of about 1 mm or less, or 10 to 800 μm, thereby accelerating the raw material speed to supersonic speed and applying a high shear force.

By the action of the shear force, the graphene may be more easily exfoliated between carbon atomic layers where carbon atoms are bonded to each other by the van der Waals force, than on a basal plane of unoxidized graphite forming a covalent bond. Thus, the graphene having a very small thickness and a large area may be effectively formed. In the method of an exemplary embodiment, by synergy with the above-described dispersant, the graphene having a very small thickness and a large area may be mass produced by more simplified process without a defect.

Meanwhile, the above-described preparation method of graphene of an exemplary embodiment may further include recovering graphene flakes from the dispersion of the graphene flakes and drying, wherein the recovering may proceed by centrifugation, vacuum filtration or pressure filtration. Further, the drying may proceed by vacuum drying at a temperature of about 30 to 200° C.

According to the method of an exemplary embodiment, a graphene having a very large area (diameter) and a very small thickness corresponding to a carbon atomic layer thickness may be easily mass produced in a high yield.

For example, the graphene may have various forms of a sheet where one or more carbon atomic layers are stacked, a plate or a flake, and more specifically, may be mainly prepared as a graphene flake form having a thickness of about 0.3 to 50 nm, or about 0.3 to 30 nm. Moreover, such graphene flake may have a large diameter of about 0.1 to 10 μm, or about 0.1 to 5 μm. Further, the graphene flake may have a very large area (diameter) to thickness, that is, a diameter/thickness ratio of about 50 to 6000, or about 50 to 1000. Herein, the "diameter" of the graphene flake may be defined as "the longest distance of straight-line distances connecting any two points on a plane of each particle, when each particle of the graphene flakes is viewed in the plane having the largest area".

As such, as the graphene having a smaller thickness and a large area, for example, a graphene flake or the like is prepared by the method of an exemplary embodiment, such graphene may express excellent electrical conductivity, thermal conductivity and stability thereof, in a more maximized manner.

Due to the excellent properties of the graphene, the graphene may be used in various fields and applications such as a conductive paste composition, a conductive ink composition, a composition for forming a heat dissipation substrate, an electrically conductive composite, a composite for EMI shielding, or a conductive material for a battery, and besides, may be very preferably used in any field or use where it is known that the application of graphene is possible or needed. The graphene may be used, representatively, in the form of dispersion or a dispersed composition dissolved or dispersed in a polar solvent, or the like, and the dispersion or dispersed composition may be used in various methods, such as being applied on a substrate, patterned after printed, or directly cast as a film.

Further, in the dispersion or dispersed composition, as the polar solvent for dispersing the graphene, an aqueous solvent such as water, or any polar solvent may be applied without particular limitation. As a specific example of the polar solvent, one or more selected from the group consisting of water, NMP, acetone, DMF (N,N-dimethylformamide), DMSO (Dimethyl sulfoxide), ethanol, isopropyl alcohol, methanol, butanol, 2-ethoxy ethanol, 2-butoxy ethanol, 2-methoxy propanol, THF (tetrahydrofuran), ethylene glycol, pyridine, dimethylacetamide, N-vinyl pyrrolidone, methyl ethyl ketone (butanone), α-terpinol, formic acid, ethyl acetate and acrylonitrile, may be used.

EXAMPLES

Hereinafter, the action and effect of the invention will be described in detail, through the specific examples of the invention. However, the examples are provided only to illustrate the present invention, and the scope of the invention is in no way determined thereby.

Preparation Example 1: Preparation of Dispersant

Pitch which is a petroleum byproduct available from POSCO underwent an oxidation process and a refining process as follows, thereby preparing the dispersant of Preparation Example 1.

First, 0.5 to 1.5 g of pitch was added to 75 ml of a mixed solution of sulfuric acid/nitric acid (volume ratio 3:1), and an oxidation reaction proceeded at 70° C. for about 3.5 hours.

Thereafter, a pitch reaction solution in which the oxidation reaction proceeded, was cooled to room temperature, and diluted with distilled water to an about 5-fold solution, and then centrifuged at about 3500 rpm for 30 minutes. Then, supernatant was removed, the same amount of distilled water was added to the solution which was then redispersed, and thereafter, centrifugation was performed again under the same condition to finally collect and dry precipitate. Through this process, the dispersant of Preparation Example 1 was prepared.

First, the molecular weight distribution of the pitch used in the preparation process of the dispersant as a raw material was analyzed by a MALDI-TOF mass spectrum, and the results are shown in FIGS. 2A and 2B (enlarged views in the range of molecular weight of 400 to 500); and the molecular weight distribution of the dispersant of Preparation Example 1 was analyzed similarly, and the results are shown in FIGS. 3A and 3B (enlarged views in the range of molecular weight of 400 to 500). The analysis was carried out by adding the pitch or the dispersant to a matrix, mixing them, and then drying the mixture, using a MALDI-TOF mass spectrum equipment (Ultraflex II, Bruker).

Referring to FIGS. 2A and 2B (enlarged views), it was confirmed that the pitch includes polyaromatic hydrocarbons having a molecular weight of 200 to 1500, and especially, from the detection of large peaks in an interval of a molecular weight of 14 Da in an enlarged view of FIG. 2B, plural kinds of polyaromatic hydrocarbons having a different number of aromatic rings (benzene rings) from each other are connected by aliphatic hydrocarbons. By contrast, referring to FIGS. 3A and 3B (enlarged views), it was confirmed that in case of the dispersant of Preparation Example 1, large peaks existing in an interval of 44 Da and 16D, respectively in the polyaromatic hydrocarbons are observed, which proves the presence of the mixture of the polyaromatic hydrocarbon oxides in which an oxygen-containing functional group such as —COOH, —OH or —SO3H is introduced to the aromatic hydrocarbons, wherein the oxides having a molecular weight of about 300 to 1000, or 300 to 700 are contained in 60% by weight or more.

Further, the pitch used as the raw material (upper) and the pitch of the Preparation Example 1 (lower) were analyzed by a 13C CPMAS NMR (Varian 400 MHz Solid-State NMR), respectively, and the analysis results are shown in FIG. 4 by comparison. Referring to FIG. 4, a carbon-derived peak of the aromatic hydrocarbons, and a carbon-derived peak of some aliphatic hydrocarbons were confirmed in the pitch, but the presence of the oxygen-containing functional group was not confirmed. By contrast, as a result of NMR analysis of the dispersant of Preparation Example 1, a peak of the oxygen-containing functional group was confirmed. The kind of the oxygen-containing functional group was confirmed to be an epoxy group, a hydroxy group, a carboxy group, or the like.

In addition, the pitch used as the raw material and the dispersant of Preparation Example 1 were analyzed by FT-IR (Agilent 660-IR) in a powder state, respectively, and the analysis results are shown in FIG. 5 by comparison. Through FIG. 5 also, it was confirmed that the peak of the oxygen-containing functional group was produced in the dispersant of Preparation Example 1.

Preparation Examples 2 to 4: Preparation of Dispersant

The dispersant of Preparation Examples 2 to 4 were prepared, respectively, in the same manner as Preparation Example 1, except that pitch which is a petroleum byproduct available from POSCO (however, the pitch was from a different sample from that of Preparation Example 1) was used, and the oxidation reaction time was 1 hour (Preparation Example 2), 3.5 hours (Preparation Example 3), and 7 hours, respectively.

The dispersants were analyzed by a MALDI-TOF mass spectrum, in the same manner as Preparation Example 1, and the results are shown together in FIG. 6 by comparison. Referring to FIG. 6, it was confirmed that as the oxidation time increases, the content of the components having a molecular weight more than about 1000, or about 700 (polyaromatic hydrocarbon oxides) in the dispersant is reduced, and thus, the dispersant in the form of a mixture containing the polyaromatic hydrocarbon oxides having a molecular weight of about 00 to 1000, or about 300 to 700 in a higher content, was obtained.

Experimental Example 1: Measurement of Oxygen Content of Dispersant 1 mg of the dispersant samples obtained in Preparation Examples 3 and 4 were heated to a high temperature of about 900° C. around on a thin foil. At this time, as the foil is instantaneously melted, the temperature was raised to about 1500 to 1800° C., and by such high temperature, gas was generated from the sample. The gas was collected and subjected to elemental analysis to measure and analyze the content of each element of carbon, oxygen, hydrogen and nitrogen. The results of this analysis are shown in following Table 1, as compared with the analysis results of the pitch used for preparation of each dispersant.

TABLE 1

| | Sample name | | | |
|---|---|---|---|---|
| | C (wt %) | H (wt %) | N (wt %) | O (wt %) |
| Pitch | 95.5 | 4.5 | | |
| Preparation Example 3: | 40.0 | 1.8 | 7.6 | 38.0 |
| Preparation Example 4: | 40.0 | 1.5 | 7.8 | 39.2 |

Referring to Table 1, it was confirmed that the oxygen content was about 12 to 50% by weight, or about 30 to 40% by weight in the dispersant of Preparation Examples 3 and 4, based on the total element content, when analyzing the content of each element.

Example 1: Preparation of Graphene Flake 2.5 g of planar graphite was added to 500 ml of aqueous dispersion where 0.1 g of the dispersant of Preparation Example 1 is dispersed to form dispersion. The dispersion was introduced to the inlet of the high pressure homogenizer at high pressure of about 1,600 bar to be passed through a micro-channel, and this process was repeated 10 times. Through this, the planar graphite was exfoliated, and the graphene flake of Example 1 was prepared.

In FIG. 7, an electron micrograph of the planar graphite used as a raw material for preparation of the graphene flake is shown in (a), and electron micrographs of the planar graphite flake prepared in Example 1 are shown in (b) and (c) (enlarged view of (b)). Referring to (b) and (c) of FIG. 7, it was confirmed that the graphene flake having a small thickness and a large area, and with minimized defects was formed very well.

The graphene flake of Example 1 was subjected to TEM analysis, and the images are shown in (a) and (b) (enlarged view of (a)) of FIG. 8. Referring to (a) of FIG. 8, it was confirmed that the graphene flake prepared in Example 1 was that having a very large area with a diameter of about 0.5 to 5 μm. Further, referring to (b) of FIG. 8 above, it was confirmed that the graphene flake of Example 1 had a very small thickness so that a carbon grid in the lower part (red arrow in the drawing) disposed for TEM analysis is observed through the graphene flake.

In addition, the graphene flake of Example 1 was subjected to AFM analysis, and the results are shown in (c) and (d) of FIG. 8, respectively. Referring to this, it was confirmed that the graphene flake of Example 1 had a very small thickness of about 6 to 17 nm.

Example 2: Preparation of Graphene Flake

The graphene flake of Example 2 was prepared in the same manner as Example 1, except that the dispersant of Preparation Example 2 is used instead of the dispersant of Preparation Example 1.

The graphene flake of Example 2 was confirmed by electron microscopy analysis. As a result of the confirmation, it was found that the graphene flake having a very small thickness and a large area, and with minimized defects was formed well. As a result of TEM and AFM analysis of the graphene flake of Example 2 in the same manner as Example 1, it was confirmed that the graphene flake of Example 2 had a very large area of a diameter of about 0.5 to 10 μm, and a very small thickness of about 5 to 20 nm.

Example 3: Preparation of Graphene Flake

The graphene flake of Example 3 was prepared in the same manner as Example 1, except that a dispersant of Triton X-100 (trade name) was used instead of the dispersant of Preparation Example 1.

FIG. 9 is an electron micrograph of the graphene flake of Example 3. Referring to FIG. 9, it was confirmed that a thin and uniform graphene flake having an area of about 5 μm2 was formed very well.

Example 4: Preparation of Graphene Flake

The graphene flake of Example 4 was prepared in the same manner as Example 1, except that the dispersant of Pluronics F-127 (trade name) was used instead of the dispersant of Preparation Example 1.

FIG. 10 is an electron micrograph of the graphene flake of Example 4. Referring to FIG. 10, it was confirmed that a thin and uniform graphene flake having an area of about 5 μm2 was formed very well.

Comparative Example 1: Preparation of Graphene Flake

The graphene flake of Comparative Example 1 was prepared using a high pressure homogenizer, by a method described in Examples of Korean Laid-Open Publication No. 2013-0004638, without using the dispersant such as the dispersant of Preparation Example 1.

FIG. 11 is an electron micrograph of the graphene flake of Comparative Example 1 ((a) of FIG. 11), which is compared with the electron micrograph of the graphene flake obtained in Example 1 ((b) of FIG. 11). Referring to (b) of FIG. 11, the graphene flake prepared in Example 1 shows an area of 10 μm2 or more which is larger than that of the graphene flake of Comparative Example 1, and also shows wrinkles, which proves that the graphene flake is thinly exfoliated so as to close to an ultra-thin type less than several nanometers.

Meanwhile, FIG. 12 is a Raman spectrum of the graphene flake of Example 1. In the Raman spectrum, a D peak (at ~1,350 cm-1) intensity is correspondingly increased as the defects within the graphene are increased, and thus, generally as the intensity ratio with a G peak (at ~1,580 cm-1) ($G_f/D_f$) is increased, the quality of graphene is evaluated as higher. Therefore, a high $G_f/D_f$ (~14.5) of the graphene flake prepared from Example 1 proves that it has high quality with less defects than $G_f/D_f$ (~5.5) of the graphene flake of Comparative Example 1. This results may be obtained by removing the processes of heat treatment, high speed grinding, and ultrasonic dispersion, differently from Comparative Example 1.

Comparative Example 2: Preparation of Oxidized Graphene Flake

First, after 2.5 g of unoxidized graphite was added to 262.5 ml of a mixed acid solution of sulfuric acid:nitric acid=3:1 (volume ratio), and reacted at 85° C. for 20 hours, the reaction solution was diluted with 1 L of ice-cooled D.I. water, and vacuum filtrated to prepare a oxidized graphite wet-cake.

Then, the oxidized graphite wet-cake was redispersed in 500 ml of D.I. water, and the redispersion was introduced to the inlet of the high pressure homogenizer at about high pressure of 1,600 bar to be passed through a micro-channel, and such process was repeated 10 times. The shape, oxidation degree and defect of the thus-prepared oxidized graphene flake of Comparative Example 2 were analyzed, respectively by an electron micrograph (Scanning Electron Microscopy; SEM), an elemental analyzer, and a Raman spectroscopy, and the results are shown in FIGS. 13 to 15.

FIG. 13 shows an electron micrograph of the oxidized graphene flake which was exfoliated using oxidized graphite. Further, referring to the Raman spectrum of FIG. 15, it was confirmed that a D-peak of about 1350 cm-1 is much larger than the result obtained from the graphene flake and the like of the Examples, which resulted from the defects generated during the oxidation process of the graphite.

Further, referring to the results of elemental analysis in FIG. 14, it shows an oxygen content of about 9.46%, which is in a very high level, as compared with the unoxidized graphite or graphene showing an oxygen content of about 1% around, and thus, is confirmed to have poor electrical properties per se. In addition, in order to form it into graphene again, an additional reduction process is needed, and it is predicted that in the course of the process, defects in graphene will be more generated, and the physical properties thereof will be deteriorated.

The invention claimed is:

1. A preparation method of graphene, the preparation method comprising:
    forming a dispersion including a carbon-based material including unoxidized graphite, and a dispersant; and
    continuously passing the dispersion through a high pressure homogenizer including an inlet, an outlet, and a micro-channel for connection between the inlet and the outlet, having a diameter in a micrometer scale,
    wherein the carbon-based material is exfoliated, as the material is passed through the micro-channel under application of a shear force, thereby forming graphene having a thickness in nanoscale, and
    wherein the dispersant includes a mixture of a plurality of polyaromatic hydrocarbon oxides, including polyaromatic hydrocarbon oxides having a molecular weight of 300 to 1000, said dispersant being present in an amount of at least 60% by weight.

2. The preparation method of claim 1, wherein the unoxidized graphite has an element ratio of oxygen to carbon (O/C atomic ratio) of 5% or less, as measured by elemental analysis measurement by combustion or XPS analysis (X-ray photoelectron spectrometry analysis).

3. The preparation method of claim 1, wherein the unoxidized graphite includes planar graphite.

4. The method of claim 1, wherein the dispersion is dispersion in which the carbon-based material and the dispersant are dissolved or dispersed in an aqueous solvent or a polar organic solvent.

5. The preparation method of claim 1, wherein the dispersant has an oxygen content of 12 to 50% by weight, based on a total element content, when the plural kinds of polyaromatic hydrocarbon oxides contained in the dispersant are subjected to elemental analysis.

6. The preparation method of claim 1, wherein the polyaromatic hydrocarbon oxides contained in the dispersant has a structure where one or more oxygen-containing functional groups are bonded to an aromatic hydrocarbon containing 5 to 30 benzene rings.

7. The preparation method of claim 6, wherein the aromatic hydrocarbon has 7 to 20 benzene rings in the structure.

8. The preparation method of claim 1, wherein the micro-channel has a diameter of 10 to 800 µm.

9. The preparation method of claim 1, wherein the dispersion is introduced to the inlet of the high pressure homogenizer under application of pressure of 100 to 3000 bar to be passed through the micro-channel.

10. The preparation method of claim 1, wherein the graphene includes a graphene flake having a thickness of 0.3 to 50 nm.

11. The preparation method of claim 9, wherein the graphene flake has a diameter of 0.1 to 10 µm, and a diameter/thickness ratio of 50 to 6000.

12. The preparation method of claim 1, further comprising recovering graphene flakes from dispersion of the graphene flakes, and drying the graphene flakes.

13. The preparation method of claim 12, wherein the recovering proceeds by centrifugation, vacuum filtration or pressure filtration.

14. The preparation method of claim 12, wherein the drying proceeds by vacuum drying at a temperature of 30 to 200° C.

* * * * *